United States Patent
Abraham et al.

(10) Patent No.: US 9,965,952 B2
(45) Date of Patent: May 8, 2018

(54) ROAD CONDITION MANAGEMENT

(71) Applicant: International Business Machines Corporation, Armonk, NY (US)

(72) Inventors: Subil M. Abraham, Lewisville, TX (US); Vinod A. Bijlani, Pune (IN); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 14/658,283

(22) Filed: Mar. 16, 2015

(65) Prior Publication Data

US 2016/0275404 A1    Sep. 22, 2016

(51) Int. Cl.
| | | |
|---|---|---|
| *G06N 5/04* | (2006.01) | |
| *G08G 1/0967* | (2006.01) | |
| *G06Q 10/00* | (2012.01) | |
| *G08G 1/01* | (2006.01) | |
| *G08G 1/095* | (2006.01) | |
| *G08G 1/00* | (2006.01) | |
| *G08G 1/02* | (2006.01) | |

(Continued)

(52) U.S. Cl.
CPC ........... *G08G 1/0967* (2013.01); *G06Q 10/20* (2013.01); *G08G 1/0112* (2013.01); *G08G 1/0116* (2013.01); *G08G 1/0129* (2013.01); *G08G 1/095* (2013.01); *G08G 1/202* (2013.01); *G08G 1/02* (2013.01); *G08G 1/04* (2013.01); *G08G 1/042* (2013.01)

(58) Field of Classification Search
CPC .. G08G 1/0967; G08G 1/0104; G08G 1/0116; G08G 1/0129; G06Q 10/20
See application file for complete search history.

(56) References Cited

U.S. PATENT DOCUMENTS

| | | | |
|---|---|---|---|
| 4,985,847 A | * | 1/1991 | Shioya ..................... G01C 3/10 250/202 |
| 6,525,671 B1 | | 2/2003 | Vannan |
| 8,095,306 B2 | | 1/2012 | Villalobos et al. |

(Continued)

FOREIGN PATENT DOCUMENTS

CN    102717753 A    10/2012

OTHER PUBLICATIONS

Eriksson et al., "The Pothole Patrol: Using a Mobile Sensor Network for Road Surface Monitoring", MobiSys'08, Jun. 17-20, 2008, Breckenridge, Colorado, USA, Copyright 2008 ACM 978-1-60558-139-2/08/06,    <http://nms.csail.mit.edu/papers/index.php?detail=180>.

(Continued)

*Primary Examiner* — Hongmin Fan
(74) *Attorney, Agent, or Firm* — Christopher McLane; David M. Quinn

(57) ABSTRACT

Road condition management is provided. A first road problem at a first location is identified, based, at least in part, on a current traffic pattern and current environmental conditions at the first location. An optimized plan for road repairs is generated. The optimized plan identifies one or more road problems. The plan is optimized based on a severity index of each of the one or more road problems and an availability of at least one resource. An alert is issued to at least one interface device, wherein the alert describes the first road problem.

17 Claims, 4 Drawing Sheets

(51) Int. Cl.
  *G08G 1/04*   (2006.01)
  *G08G 1/042*  (2006.01)

(56) References Cited

U.S. PATENT DOCUMENTS

| | | |
|---|---|---|
| 8,188,887 B2 | 5/2012 | Catten et al. |
| 2012/0083995 A1* | 4/2012 | Vorona ................. G08G 1/0104 701/119 |
| 2012/0197588 A1 | 8/2012 | Lee et al. |
| 2013/0154854 A1 | 6/2013 | Chen et al. |
| 2014/0067265 A1 | 3/2014 | Maston |
| 2014/0094989 A1* | 4/2014 | Dadu ................... G08G 1/0962 701/1 |
| 2014/0160295 A1 | 6/2014 | Kyomitsu et al. |
| 2015/0161540 A1* | 6/2015 | Akselrod ......... G06Q 10/06311 705/7.13 |

OTHER PUBLICATIONS

Hudson, Paul, "Potholes cause £1 billion of damage to cars", The Telegraph, GMT Jan. 8, 2013, © Copyright of Telegraph Media Group Limited 2014, <http://www.telegraph.co.uk/motoring/news/9785879/Potholes-cause-1-billion-of-damage-to-cars.html>.

Tembhekar et al., "Potholes bring car speeds down to 15 kmph", The Times of India, Aug. 10, 2011, Copyright © 2014 Bennett, Coleman & Co. Ltd., <http://articles.timesofindia.indiatimes.com/2011-08-10/mumbai/29871251_1_traffic-police-potholes-kmph>.

* cited by examiner

ROAD CONDITION MANAGEMENT

BACKGROUND OF THE INVENTION

The present invention relates generally to the field of road infrastructure and more particularly to road condition management.

Monitoring the condition of road infrastructure has become increasingly important over recent years. Construction projects (such as water system and fiber optic network installations, inclement weather) and high usage are common causes of poor road conditions. Poor road conditions, including lane closures and potholes, cause traffic congestion, especially in large developing cities. Poorly maintained road surfaces also result in motorists incurring higher vehicle maintenance costs.

SUMMARY

According to one embodiment of the present invention, a method for road condition management is provided. The method includes identifying, by one or more processors, a first road problem at a first location based, at least in part, on a current traffic pattern and current environmental conditions at the first location; generating, by one or more processors, an optimized plan for road repairs, wherein the optimized plan identifies one or more road problems that include the first road problem, and wherein the optimized plan is optimized based on a severity index of each of the one or more road problems and an availability of at least one resource; and issuing, by one or more processors, an alert to at least one interface device, wherein the alert describes the first road problem.

According to another embodiment of the present invention, a computer program product for road condition management is provided. The computer program product comprises a computer readable storage medium and program instructions stored on the computer readable storage medium. The program instructions include program instructions to identify a first road problem at a first location based, at least in part, on a current traffic pattern and current environmental conditions at the first location; program instructions to generate an optimized plan for road repairs, wherein the optimized plan identifies one or more road problems that include the first road problem, and wherein the optimized plan is optimized based on a severity index of each of the one or more road problems and an availability of at least one resource; and program instructions to issue an alert to at least one interface device, wherein the alert describes the first road problem.

According to another embodiment of the present invention, a computer system for road condition management is provided. The computer system includes one or more computer processors, one or more computer readable storage media, and program instructions stored on the computer readable storage media for execution by at least one of the one or more processors. The program instructions include program instructions to identify a first road problem at a first location based, at least in part, on a current traffic pattern and current environmental conditions at the first location; program instructions to generate an optimized plan for road repairs, wherein the optimized plan identifies one or more road problems that include the first road problem, and wherein the optimized plan is optimized based on a severity index of each of the one or more road problems and an availability of at least one resource; and program instructions to issue an alert to at least one interface device, wherein the alert describes the first road problem.

DETAILED DESCRIPTION

Embodiments of the present invention recognize that road conditions are monitored and inspected manually by governmental maintenance agencies or their representatives. Auditors visit roads to ensure safe and efficient conditions, taking note of problem areas. Roads are often in a state of disrepair or maintenance for long periods of time.

Embodiments of the present invention recognize that manually monitoring and inspecting road infrastructure is inefficient and time-consuming. In addition to contributing to higher costs for the governments or agencies to perform these functions, delays in detecting poor road conditions result in more traffic congestion and accidents, increased vehicular damage and repair costs, and higher motorist fuel usage.

Embodiments of the present invention provide for road condition management. Various embodiments provide for identifying road problems, predicting the impact of road problems on traffic patterns, assigning severity indices to road problems, dynamically prioritizing road repairs based on newly detected road problems, creating road repair plans, and alerting travelers of potential traffic and safety issues. Road problems include, for example, potholes, debris, lane closures, disabled vehicles, or any other conditions related to road maintenance that impede or detract from normal travel flow.

The flowchart and block diagrams in the Figures illustrate the architecture, functionality, and operation of possible implementations of systems, methods, and computer program products according to various embodiments of the present invention. In some alternative implementations, the functions noted in the block may occur out of the order noted in the Figures. For example, two blocks shown in succession may, in fact, be executed substantially concurrently, or the blocks may sometimes be executed in the reverse order.

The present disclosure will now be described in detail with reference to the Figures.

Figure 1:
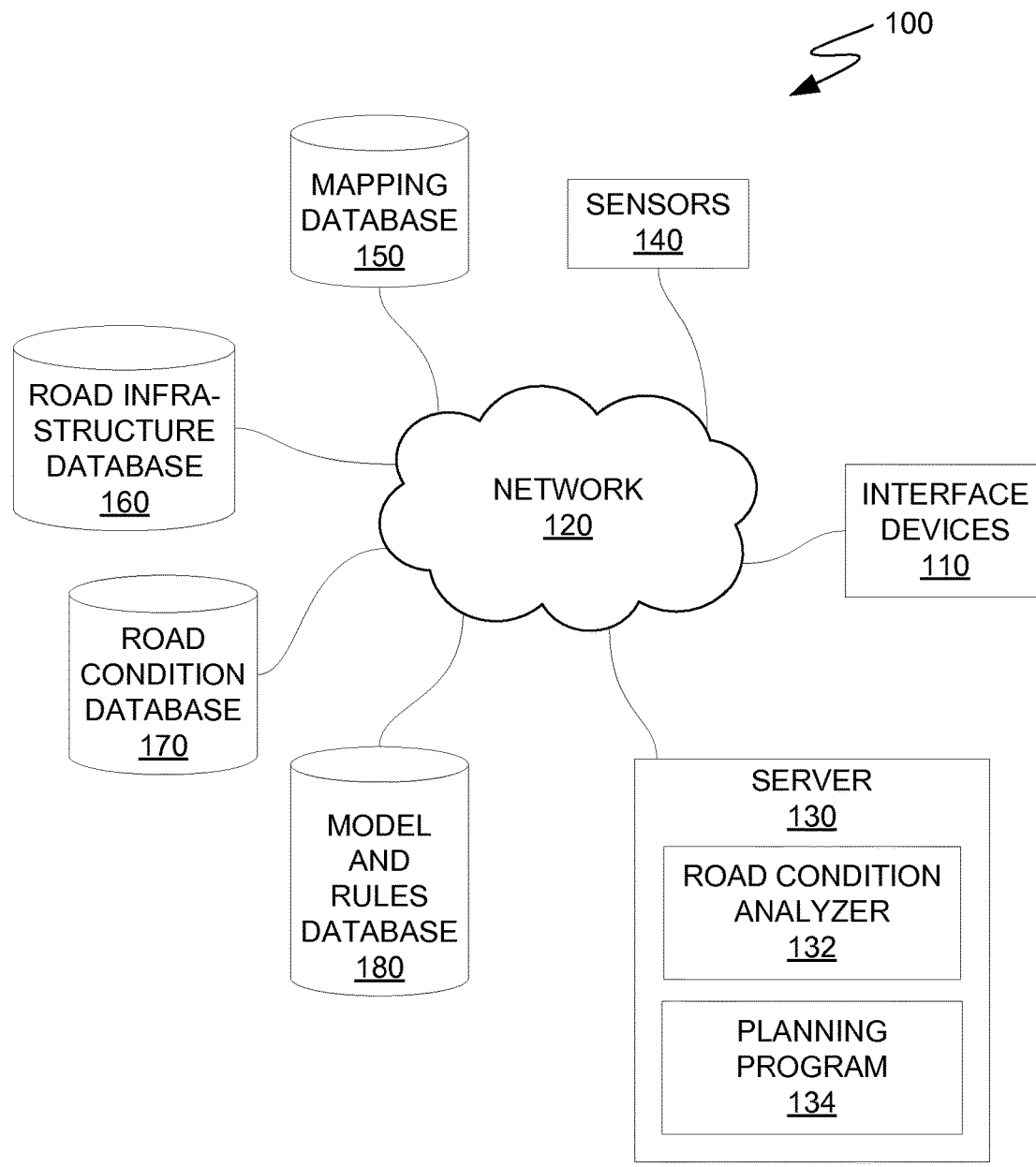
FIG. 1 is a functional block diagram illustrating a computing environment, in accordance with an embodiment of the present disclosure.

FIG. 1 is a functional block diagram illustrating a computing environment, in accordance with an embodiment of the present disclosure. For example, FIG. 1 is a functional block diagram illustrating computing environment 100. Computing environment 100 includes interface devices 110, server 130, sensors 140, mapping database 150, road infrastructure database 160, road condition database 170, and model and rules database 180 connected over network 120. Server 130 includes road condition analyzer 132, and planning program 134.

In various embodiments, server 130 is a computing device that can be a standalone device, a server, a laptop computer, a tablet computer, a netbook computer, a personal computer (PC), or a desktop computer. In another embodiment, server 130 represents a computing system utilizing clustered computers and components to act as a single pool of seamless resources. In general, server 130 can be any computing device or a combination of devices with access to sensors 140, mapping database 150, road infrastructure database 160, road condition database 170, model and rules database 180, and interface devices 110, and with access to and/or capable of executing road condition analyzer 132 and planning program 134. Server 130 may include internal and external hardware components, as depicted and described in further detail with respect to FIG. 4.

In this exemplary embodiment, road condition analyzer 132 and planning program 134 are stored on server 130. In other embodiments, one or more of road condition analyzer 132 and planning program 134 may reside on another computing device, provided that each can access each other and sensors 140, mapping database 150, road infrastructure database 160, road condition database 170, model and rules database 180, and interface devices 110. In yet other embodiments, one or more of road condition analyzer 132 and planning program 134 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between interface devices 110, server 130, sensors 140, mapping database 150, road infrastructure database 160, road condition database 170, and model and rules database 180, in accordance with a desired embodiment of the present invention.

Interface devices 110 represents one or more devices that present information to a user. In various embodiments, interfaces device 110 include a computing device that can be a standalone device, a server, a laptop computer, a tablet computer, a netbook computer, a personal computer (PC), or a desktop computer. In other embodiments, interfaces device 110 include a street sign, a billboard, a smartphone, a mobile device, a navigation device, a street light, a siren, or a public alert system. In one embodiment, interface devices 110 include a computing device of a vehicle that controls at least one onboard sensor or safety system on a vehicle. In one embodiment, interface devices 110 include a smartphone that presents information to a user via a text message, email, or other form of notification. For example, the text message indicates a road problem. In one embodiment, interface devices 110 include an electronic street sign that presents information to a user (e.g., travelers on a road) via a textual message. For example, the digital message indicates that motorists are approaching a section of the road that is closed during a specified time of day. In one embodiment, interface devices 110 include a sign that alerts motorists that they are approaching a portion of the road that contains a road problem. For example, the sign indicates that motorists are approaching the scene of an accident and that the speed limit is now forty-five miles per hour (rather than the normal sixty-five miles per hour). In another embodiment, one or more of interface devices 110 represents a computing system utilizing clustered computers and components to act as a single pool of seamless resources. In general, interface devices 110 can be any computing device or a combination of devices with access to server 130 over network 120. Interface devices 110 may include internal and external hardware components, as depicted and described in further detail with respect to FIG. 4.

Sensors 140 operate to detect information about a roadway, its traffic patterns, and its surrounding environment. In one embodiment, sensors 140 include devices that measure and characterize traffic flow. For example, sensors 140 are in-roadway vehicle detection sensors (e.g., bending plates, inductive loops, magnetic sensors, pneumatic road tubes, or weigh-in-motion sensors) or above-ground vehicle detection sensors (e.g., infrared detectors, Doppler radar, passive acoustic devices, video image detection systems). In various examples, these sensors are used to detect the presence of a vehicle at a particular point, measure traffic volume (i.e., count vehicular traffic across a point in the road over a given time interval), measure traffic speed, and measure traffic density. In another example, sensors 140 are a pair of pneumatic road tubes that are separated by a predetermined distance in the direction of traffic flow and allow for the measurement of the speed of a vehicle based on the predetermined distance and the amount of time between the vehicle passing over each tube of the pair. In another example, sensors 140 are passive infrared traffic detectors that sense changes in thermal radiation, relative to the background thermal radiation, that result from an object (e.g., a vehicle) in the field of view. In one embodiment, sensors 140 monitor and determine the condition of road surfaces (e.g., the presence and amount of water, ice or snow). In one example, sensors 140 include a laser sensor system that measures one or more conditions such as road surface temperature, a coefficient of friction of the road surface, and an amount of ice on the road surface. In one embodiment, sensors 140 include devices that monitor and record traffic patterns. For example, sensors 140 are traffic cameras that are placed along roads at certain spacing intervals, intersections, or places of frequent traffic congestion. These cameras record video and still pictures of road traffic, and the information can be used to identify changes in traffic patterns and their associated locations. In one embodiment, sensors 140 provide sensor data used (by, for example, road condition analyzer 132) to monitor and record weather conditions. In one embodiment, sensors 140 include on-vehicle sensors. For example, sensors 140 include one or more sensors (e.g., camera, accelerometer, or other computerized sensor) on board a vehicle that gather information about the depth of potholes that the vehicle passes over or near. In various examples, sensors 140 include a thermometer, a wind meter, a frost meter, a rain gauge, a lightning detector, a barometer, or a light meter. In some embodiments, sensors 140 are adjustable. For example, a camera may move (e.g., pan or tilt), responsive to an instruction requesting a movement, in order to provide better imagery of a portion of a road where there is an accident. Sensors 140 are discussed in further detail in connection with FIG. 2.

Mapping database 150 is a data repository that stores mapping data. Mapping database 150 may be written to and read by one or more of road condition analyzer 132 and planning program 134. In one embodiment, mapping database 150 stores geographic information system (GIS) data about a city's infrastructure. For example, mapping database 150 stores description and location information about all roads and traffic devices in a city. In a further example, traffic devices include, for example, traffic control devices (e.g., street lights), traffic monitoring devices (e.g., video cameras), and programmable electronic signs. In some embodiments, mapping database 150 may be written to and read by programs and entities outside of computing environment 100 in order to populate the repository with information relevant to the system operation, such as, for example, the location of a new streetlight.

Road infrastructure database 160 is a data repository that stores road infrastructure data. Road infrastructure database 160 may be written to and read by one or more of road condition analyzer 132 and planning program 134. In one embodiment, road infrastructure database 160 stores data pertaining to maintaining roads under a governmental or other organization's jurisdiction. For example, road infrastructure database 160 contains road maintenance information such as, for example, road repair budgets, work crew information (e.g., quantity, skillsets, availability), road repair equipment information (e.g., types, quantities, availability, skills required to operate), road repair project plans (e.g., schedules, status), historical project cost and schedule data, average time allotted for different types of road maintenance projects, emergency operation plans, and union regulations. In some embodiments, road infrastructure database 160 may be written to and read by programs and entities outside of computing environment 100 in order to populate the repository with information relevant to the system operation.

Road condition database 170 is a data repository that stores road condition data. Road condition database 170 may be written to and read by one or more of road condition analyzer 132 and planning program 134. In one embodiment, road condition database 170 stores data relating to the conditions (e.g., road conditions) and circumstances (e.g., weather) that affect travel patterns. For example, road condition database 170 stores information indicating locations and descriptions of irregularities in road surfaces, such as potholes and roads under repair. In one embodiment, road condition database 170 stores information about obstacles or blockages that affect traffic patterns. For example, road condition database 170 identifies locations of lane closures and the timeframe during which they are closed. In one embodiment, road condition database 170 stores data regarding road closures and alternate routes. For example, road condition database 170 stores information about a section of road that is closed for one week due to a paving project, and stores alternate route suggestions and the best times of day to use each route. In some embodiments, road condition database 170 may be written to and read by programs and entities outside of computing environment 100 in order to populate the repository with information relevant to the system operation. Such information includes, for example, a Coast Guard notice of a drawbridge closure due to a boating accident.

Model and rules database 180 is a data repository that stores traffic pattern models and exclusionary rules data. Model and rules database 180 may be written to and read by one or more of road condition analyzer 132 and planning program 134. In one embodiment, model and rules database 180 stores models that correlate historical traffic pattern data (e.g., vehicle types, traffic volume, average traffic speed, traffic deviations) with condition data (e.g., locations, time of day, weather conditions). For example, based on historical traffic pattern data and relevant sensor data, such as, for example, weather and time information, road condition analyzer 132 models normal traffic patterns under different conditions and at different times of day. In a further example, the model indicates that traffic speeds are fifteen miles per hour slower when roads are icy than when roads are dry.

In one embodiment, model and rules database 180 stores exclusionary rules that define exceptions to the model. In one embodiment, each exclusionary rule identifies a date, a time, and a location of an exception. For example, an exclusionary rule corresponds to a predefined event that occurs either one time or on a predefined recurring schedule. For example, an exclusionary rule describes traffic delays and slower minimum vehicle speeds on roads within a one mile radius of a professional football stadium for the three hours prior to and after a game or other event at the stadium. In another example, a rule describes traffic pattern deviations, such as road closures during a holiday parade.

In some embodiments, model and rules database 180 may be written to and read by programs and entities outside of computing environment 100 in order to populate the repository with information relevant to the system operation. Model and rules database 180 is discussed in further detail in connection with FIG. 2.

Road condition analyzer 132 operates to determine whether there is a road problem. In one embodiment, road condition analyzer 132 models normal traffic patterns based on historical traffic patterns and environmental data. The model correlates conditions with expected traffic patterns. For example, the model generated by road condition analyzer 132 correlates conditions such as clear and sunny skies between the hours of 2:00 PM and 4:00 PM with expected traffic patterns such as travel speed between fifty-five and sixty-five miles per hour for a given portion of road. In a further example, the model indicates that traffic speeds between forty and fifty-five miles per hour are expected for the same portion of road under different conditions, such as when snowfall rates exceed one inch per hour. Road condition analyzer 132 is discussed in further detail in connection with FIG. 2.

Planning program 134 operates to determine an optimized road repair plan. Planning program 134 determines an impact of a road repair issue on a current traffic pattern. Planning program 134 projects an impact of a road problem on a future traffic pattern. Planning program 134 determines a severity index of a road problem. Planning program 134 determines one or more resource requirements of a road problem. Planning program 134 determines an optimized road repair plan. Planning program 134 issues an alert to one or more interface devices. Planning program 134 is discussed in further detail in connection with FIG. 3.

Figure 2:
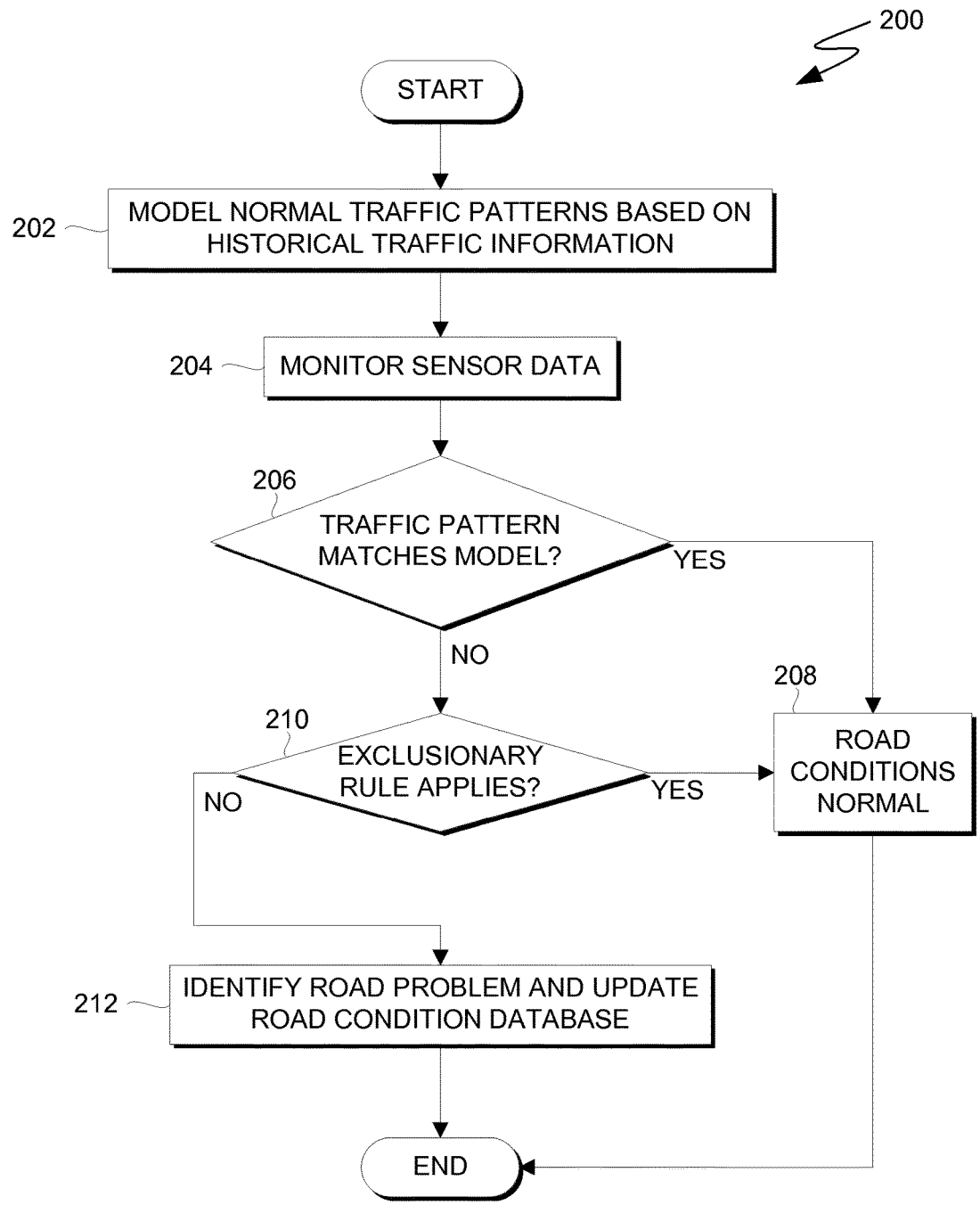
FIG. 2 is a flowchart depicting operations for analyzing road conditions within the computing environment of FIG. 1, in accordance with an embodiment of the present disclosure.

FIG. 2 is a flowchart depicting operations for road condition management within the computing environment of FIG. 1, in accordance with an embodiment of the present disclosure. For example, FIG. 2 is a flowchart depicting operations 200 of road condition analyzer 132, on server 130 within computing environment 100.

In step 202, road condition analyzer 132 models normal traffic patterns based on historical traffic information. The historical traffic information includes conditions and traffic patterns. Road condition analyzer 132 generates a model that correlates conditions (e.g., environmental conditions, road conditions, location) with traffic patterns (e.g., traffic volume, speed, paths of travel, types of vehicles) occurring concurrently with the conditions. Thus, the model predicts expected traffic patterns under various conditions. In one embodiment, road condition analyzer 132 receives the historical traffic information. For example, road condition analyzer 132 receives the historical traffic information from one or more of mapping database 150, road infrastructure database 160, road condition database 170, and model and rules database 180. In another embodiment, road condition analyzer 132 builds the historical traffic information. For example, road condition analyzer 132 builds the historical traffic information based on observed sensor data (e.g., air temperature, precipitation rate, precipitation accumulation, time of day, location, camera imagery, traffic flow information). In one example, the model correlates an amount of snow accumulation with an expected decrease in traffic speed. In this example, the model predicts that traffic speed decreases by ten miles per hour when snow accumulation equals one inch over a one hour time frame. In another embodiment, the model correlates different times of day with different traffic patterns. For example, the model correlates times from 7:00 AM through 9:00 AM and from 4:00 PM through 6:00 PM with vehicle volume between eight and eleven hundred vehicles per hour and an average speed of forty-five miles per hour with a standard deviation of ten miles per hour. Conversely, the model correlates 3:00 AM with vehicle volume between one hundred fifty and two hundred fifty vehicles per hour and an average speed of sixty miles per hour with a standard deviation of five miles per hour. In one embodiment, the predictions of the model require a predetermined level of statistical power. For example, road condition analyzer 132 generates a model that predicts traffic patterns within confidence intervals having ninety-five percent confidence levels.

In step 204, road condition analyzer 132 monitors sensor data from sensors 140. In one embodiment, road condition analyzer 132 determines a current traffic pattern based on sensor data from sensors 140. For example, based on sensors 140 data, road condition analyzer 132 determines that highway traffic is moving at an average speed of sixty-one miles per hour at a volume of ten thousand vehicles per hour. In one embodiment, road condition analyzer 132 determines current conditions based on sensors 140 data. For example, road condition analyzer 132 determines, based on sensors 140 data, that it is 1:30 PM on a sunny weekday. In one embodiment, road condition analyzer 132 determines current conditions and a current traffic pattern based on the sensor data. For example, road condition analyzer 132 determines current environmental conditions based on sensor data indicating dry and sunny weather. In another example, road condition analyzer 132 determines a current traffic pattern based on sensor data indicating that vehicles are traveling at fifty-five miles per hour. In some embodiments, road condition analyzer 132 uses sensor data to refine the traffic patterns created in step 202. Road condition analyzer 132 utilizes the current conditions and traffic pattern as feedback to improve the accuracy of the modeled normal traffic patterns. For example, responsive to receiving sensor data indicating deviations in modeled traffic patterns after an additional lane was added to a section of highway (e.g., as reflected by an update to mapping database 150), road condition analyzer 132 refines the traffic pattern models by updating the modeled normal traffic patterns on this section of highway.

In decision 206, road condition analyzer 132 determines whether a current traffic pattern matches the model. Road condition analyzer 132 determines whether the current traffic pattern matches the model based on the sensor data and the model of normal traffic patterns. Road condition analyzer 132 determines the current traffic pattern based on sensor data received from sensors 140. Road condition analyzer 132 identifies a traffic pattern of the model that corresponds to the current conditions. If the current traffic pattern matches the traffic pattern of the model (decision 206, YES branch), then road condition analyzer 132 determines that the road conditions are normal (step 208). If the current traffic pattern does not match the traffic pattern of the model (decision 206, NO branch), then road condition analyzer 132 determines whether an exclusionary rule applies (decision 210).

In one example, road condition analyzer 132 determines a current traffic pattern indicating that traffic on a dry portion of a highway is moving at an average speed of twenty-five miles per hour at 2:00 PM on a sunny, warm Sunday afternoon in fall. Responsive to correlating this traffic pattern and these conditions with traffic pattern data (i.e., the model) in model and rules database 180, road condition analyzer 132 determines that this traffic pattern does not match the model based on the corresponding traffic pattern of the model indicating a traffic speed range of fifty-five to seventy miles per hour for this portion of highway under these conditions. In another example, road condition analyzer 132 receives weather sensor data, video camera footage, timestamp information, and vehicle speed sensor data indicating weather conditions are sunny and dry, and traffic is moving at twenty miles per hour slower than the model predicts for that time of day on that stretch of road, for the current conditions. Based on this information, and the normal traffic patterns modeled in step 202, road condition analyzer 132 determines that the current traffic pattern does not match the model and, in response, road condition analyzer 132 proceeds to decision 210.

In other embodiments, the traffic pattern indicates a path of the vehicular traffic at a location. The path of travel indicates a path followed by one or more of the vehicles traversing a portion of road that includes the location. The path that is generated (by, e.g., road condition analyzer 132) represents an average path of travel, based on an observed path of travel of one or more vehicles traversing the portion of road. For example, road condition analyzer 132 determines a location of one or more vehicles at various points along the path of travel and determines the average path of travel based on a geometric average of the location of each vehicle at each corresponding point. In one embodiment, the path of travel includes a precision or tolerated deviation. For example, a traffic pattern of the model indicates a path of travel that is parallel to lane markings on the portion of the road, within a tolerated deviation of two feet. In one embodiment, road condition analyzer 132 determines whether the traffic pattern matches a model (decision 206) based, at least in part, on the path of travel of the current traffic pattern and a path of travel of a traffic pattern of the model. For example, road debris causes vehicles to swerve out of a normal path of travel. In this case, road condition analyzer 132 determines a path of travel of the current conditions that does not match the traffic pattern of the model that corresponds to the current conditions. In response, road condition analyzer 132 determines that the traffic pattern does not match the model (decision 206, NO branch) and, in response, road condition analyzer 132 proceeds to decision 210.

In decision 210, road condition analyzer 132 determines whether an exclusionary rule applies. An exclusionary rule includes one or more criteria (e.g., one or more environmental conditions, dates, times, locations, or any combination thereof). An exclusionary rule applies if the criteria of the exclusionary rule are met. An exclusionary rule corresponds to a predefined event. In one embodiment, an event is a one-time event. A holiday parade that blocks traffic on a particular route during a specific timeframe on a specific date is an example of a predefined one-time event. An exclusionary rule for such an event includes criteria identifying portions of road along the route, the timeframe, and the date. A road construction project that blocks or diverts traffic on a specific road during the scheduled time of the project is another example of a predefined one-time event. In one embodiment, an event is a recurring event. For example, an exclusionary rule for a city with a professional football team includes criteria identifying a timeframe on specific dates (e.g., home football game days) when vehicle traffic within a two mile radius of the stadium moves twenty miles per hour or more below the average rate of travel, including not moving at all. In another embodiment, an event relates to extreme weather conditions. For example, an exclusionary rule indicates that traffic patterns deviate from normal when rainfall accumulation over a twenty-four hour period exceeds eight inches.

If road condition analyzer 132 determines that an exclusionary rule applies (decision 210, YES branch), then road condition analyzer 132 determines that road conditions are normal (step 208). If road condition analyzer 132 determines that an exclusionary rule does not apply (decision 210, NO branch), then road condition analyzer 132 identifies a road problem (step 212).

In one example, road condition analyzer 132 determines whether an exclusionary rule applies (decision 210) based on current conditions. Based on data from sensors 140, road condition analyzer 132 determines current conditions indicating snow accumulation of one inch and a time of 7:30 PM. Road condition analyzer 132 compares these conditions to the exclusionary rules stored in model and rules database 180. In this example, model and rules database 180 includes a first exclusionary rule with criteria specifying weekdays and times between 5:00 PM and 7:00 PM. Model and rules database 180 further includes a second exclusionary rule with criteria specifying snow accumulation greater than three inches. In this case, road condition analyzer 132 fails to identify an exclusionary rule having criteria that are all satisfied by the conditions, based on which road condition analyzer 132 determines that no exclusionary rules apply (decision 210, NO branch). In response, road condition analyzer 132, identifies a road problem (step 212).

In another example, road condition analyzer 132 determines whether an exclusionary rule applies (decision 210). Based on data from sensors 140, road condition analyzer 132 determines the current conditions, which indicate vehicular traffic along a particular portion of road with an average speed of ten miles per hour at 2:00 PM on a particular Saturday. In this example, model and rules database 180 includes an exclusionary rule with criteria identifying a timeframe from 1:00 PM to 3:15 PM on that particular Saturday and a location of several portions of road that happen to be the route to a popular concert venue. Road condition analyzer 132 determines that the current conditions meet the criteria of the exclusionary rule stored in model and rules database 180, based on which road condition analyzer 132 determines that the exclusionary rule applies (decision 210, YES branch). In response, road condition analyzer 132 determines that road conditions are normal (step 208).

In step 212, road condition analyzer 132 identifies a road problem and updates road condition database 170. In one embodiment, road condition analyzer 132 uses sensor data to analyze the road problem. For example, road condition analyzer 132 acquires GIS coordinate data, video imagery, and still photographs from multiple cameras to identify a portion of a highway that is damaged (e.g., steep, irregularly sided grooves in the road surface). In one embodiment, road condition analyzer 132 adjusts one or more sensors 140. For example, road condition analyzer 132, using data in one or both of mapping database 150 and road infrastructure database 160, identifies an adjustable traffic camera located near the road problem and sends a command instructing the camera to adjust (e.g., pan, tilt or zoom) in order to provide a better view of the road problem. In a further example, the camera imagery indicates a stranded vehicle in the left lane of a busy city street, and traffic congestion in both directions. In one embodiment, road condition analyzer 132 estimates the project resources (e.g., budget, number and type of work crew personnel, project duration) that will be required to repair the road problem. In one example, the estimate is based on identifying project resources that were required to fix a previously-identified road problem with similar characteristics. In one embodiment, road condition analyzer 132 updates road condition database 170 with information about the road problem. This information includes, for example, a description of the road problem, the location of the road problem, the date the road problem was identified, and the traffic pattern deviations (compared to models of normal traffic patterns) surrounding the road problem.

Figure 3:
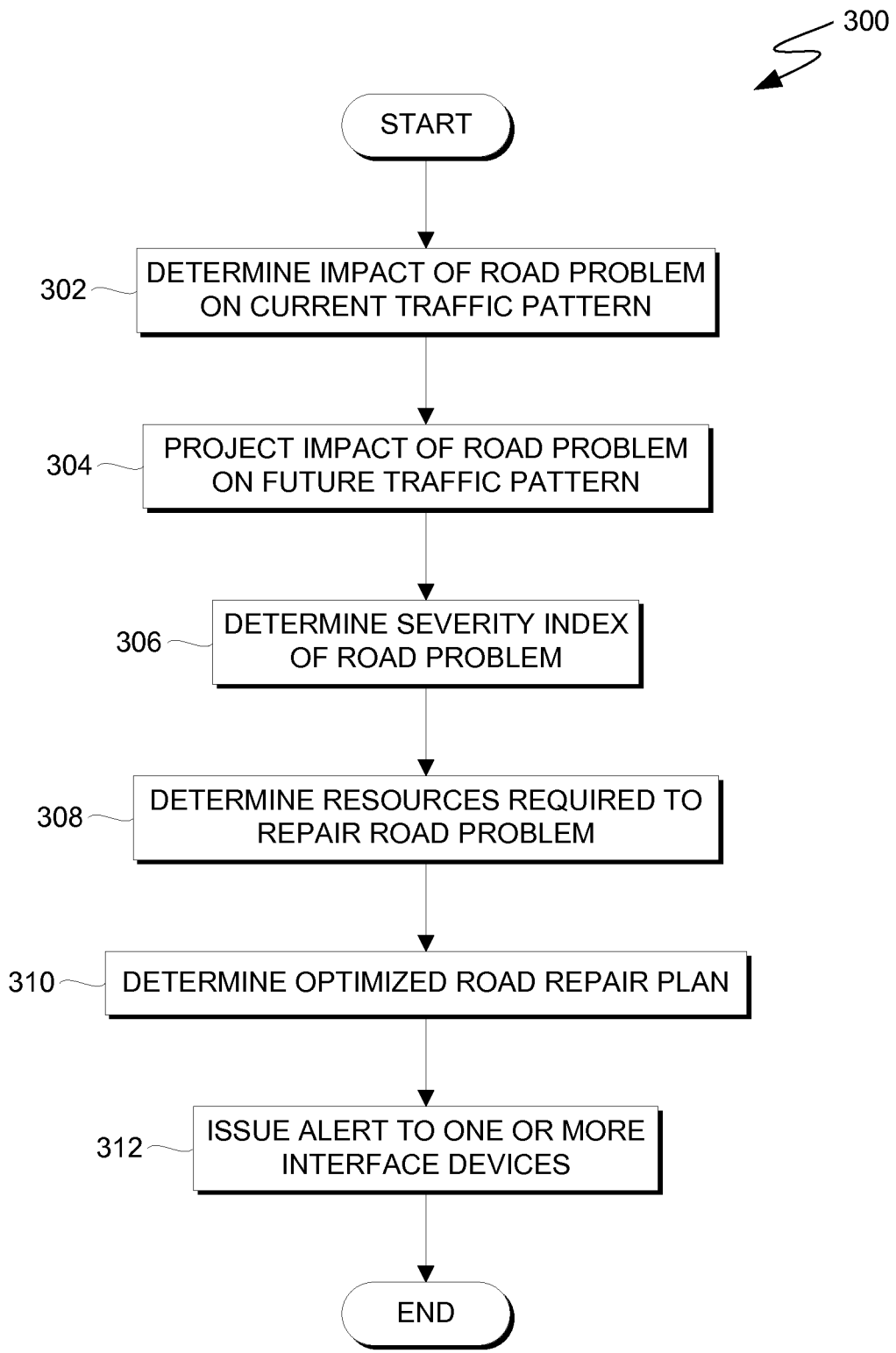
FIG. 3 is a flowchart depicting operations for determining an optimized road repair plan within the computing environment of FIG. 1, in accordance with an embodiment of the present disclosure.

FIG. 3 is a flowchart depicting operations for determining an optimized road repair plan within the computing environment of FIG. 1, in accordance with an embodiment of the present disclosure. For example, FIG. 3 is a flowchart depicting operations 300 of planning program 134, on server 130 within computing environment 100.

In step 302, planning program 134 determines an impact of a road problem on a current traffic pattern. In one embodiment, planning program 134 acquires details of a road problem from road condition database 170. In another embodiment, planning program 134 also acquires data from one or more of mapping database 150, road infrastructure database 160, and model and rules database 180. For example, the details indicate a road problem located in a rightmost lane of a northbound portion of a highway, a quarter mile before the rightmost lane splits into two lanes, one leading into an eastbound highway and one continuing as part of the northbound highway. Planning program 134 determines the impact based on the deviation of the current traffic pattern from the normal traffic pattern. The normal traffic pattern is the traffic pattern of the model corresponding to the current conditions. For example, planning program 134 compares the current traffic pattern to the normal traffic pattern to determine that the average vehicular speed at the location of the road problem is twenty miles per hour slower than normal.

In step 304, planning program 134 projects an impact of a road problem on a future traffic pattern. Planning program 134 projects the impact on a future traffic pattern utilizing predictive analytics to project the impact of the road problem on the speed of vehicular traffic. Planning program 134 utilizes predictive analytics to determine the rate of deterioration of the road problem, which is the rate of increase of the deviation between the normal traffic pattern and the projected traffic pattern. Planning program 134 determines the rate of deterioration based, at least in part, on at least one of weather information, traffic pattern information, and exclusionary rule information. In one embodiment, planning program 134 determines the rate of deterioration based on weather information. For example, planning program 134 determines a higher rate of deterioration of a road problem based on weather information forecasting icy conditions relative to weather information forecasting sunny and dry conditions. In another embodiment, planning program 134 determines the rate of deterioration based on traffic pattern information. For example, planning program 134 predicts a lower rate of deterioration for a road problem on a road with lower vehicular volume and lower average speed relative to a road problem on a road with higher vehicular volume and higher average speed. In another embodiment, planning program 134 determines the rate of deterioration based on exclusionary rule information. For example, if an exclusionary rule indicates that a road having a road problem is closed for a specified time period, planning program 134 determines the rate of deterioration of the road problem without regard to the normal traffic pattern during the specified time period.

In some embodiments, planning program 134 projects an impact of a road problem on future traffic patterns of more than one road. For example, planning program 134 predicts the impact of the pothole described previously (in the rightmost lane of a northbound portion of a highway) on an eastbound highway to which it connects. Planning program 134 analyzes current traffic pattern data (from sensors 140) and historical traffic pattern data and models (from model and rules database 180), and determines that traffic patterns are different than they were before the pothole existed. Planning program 134 determines that average traffic speeds are ten miles per hour slower where the two highways merge, traffic volume coming from the northbound highway is seven percent lower, and the number of traffic accidents near where the two highways merge is five percent higher than before the pothole existed.

In step 306, planning program 134 determines a severity index of a road problem. The severity index is a measure of the degree to which the road problem disrupts (impacts) traffic patterns. Planning program 134 determines the severity index based on at least one of the impact of the road problem on a current traffic pattern, the current environmental conditions, the impact of the road problem on a future traffic pattern, and a forecast of future environmental conditions. In one embodiment, a high severity index indicates a high degree of traffic pattern disruption; a low severity index indicates a low degree of traffic pattern disruption. For example, using road problem examples given previously, planning program 134 determines that the severity index of the pothole on a northbound highway is higher than the severity index of the pothole on a small country road.

In one embodiment, the severity index is based, at least in part, on the predicted rate of deterioration of a road problem over time. In one embodiment, the higher the rate of deterioration of a road problem, the higher the severity index that planning program 134 assigns to a road problem. In one embodiment, weather conditions affect road problem deterioration. Examples of weather-related factors in road problem deterioration include expanding and contracting of surfaces due to temperature changes, snow plow blades hitting and grinding road surfaces, erosion over time caused by precipitation (e.g., rain or snow), and erosion from materials used in road maintenance (e.g., salt, sand). In one embodiment, planning program 134 correlates weather conditions with road problem deterioration rates. For example, based on historical data stored in road infrastructure database 160, planning program 134 determines that potholes deteriorate faster during months with high snowfall (months in which snowfall accumulations exceed eight inches during any twelve hour period) than during months without snowfall. Based on this data, planning program 134 assigns a higher severity index to a pothole identified during a high snowfall month than to a pothole identified during a low snowfall month.

In another embodiment, the severity index is based, at least in part, on traffic pattern data. Planning program 134 correlates traffic pattern data with road problem deterioration rates. In one example, based on analyzing historical data about potholes and traffic patterns on roads with potholes, planning program 134 identifies a correlation between pothole deterioration and vehicular traffic types and volumes. For example, planning program 134 determines that, on roads where at least twenty percent of the vehicles travelling over the potholes are commercial vehicles weighing twenty-six thousand pounds or more (i.e., class 7 and above rated vehicles) pothole deterioration increases fifteen percent every two weeks and average vehicular speed decreases five miles per hour every two weeks. In another example, planning program 134 determines that, on road where less than five percent of the vehicles travelling over the potholes are class 7 and above rated vehicles, pothole deterioration increases one percent every two weeks and average vehicular speed does not decrease over time.

In one embodiment, the severity index is based, at least in part, on the availability of an alternate route of travel to the road affected by the road problem. For example, if the road problem is located on the only entrance road to a heavily visited national park, planning program 134 will assign that road problem a high severity index. In another example, if the road problem is located on a small country road that was replaced by a four-lane highway as the main route connecting two towns, planning program 134 assigns a low severity index to the road problem.

In step 308, planning program 134 determines one or more resources required to repair a road problem. In some embodiments, planning program 134 determines resources required to repair a road problem by analyzing historical road repair plans for repairing similar road problems under similar conditions. In one embodiment, planning program 134 identifies similar road problems by identifying road problems with similar severity indices. For example, planning program 134 identifies a historical road repair plan (in road infrastructure database 160, for example) for a similar road problem (e.g., a pothole on a highway). Planning program 134 further identifies that the project resources required to repair that pothole included four workers (e.g., one traffic control person and three laborers), three pieces of equipment (e.g., pavement grinder, surface grader, surface paver), and ten roadwork warning items (e.g., handheld red flags, plastic orange cones, temporary warning signs, flashing lights). The road crew was at the repair site for four hours, and the total cost of the project was five thousand dollars. Planning program 134 uses this set of resources as a baseline for determining resources required for the current pothole, and modifies resource requirements to take into account current road repair practices and other relevant economic conditions (e.g., updated specifications of road repair equipment and efficiency improvements, updated labor rates, raw material prices). For example, planning program 134 identifies that the current method for pothole repair uses a machine that takes the place of the surface grinder and the surface grader and reduces the required road crew from four members to three members. Planning program 134 analyzes the effects of all variables that have changed, and determines the required list of resources and the cost to repair the pothole, if the project were to begin immediately. In order to account for possible changes (in the required resources and associated costs) that will occur by the time the project begins, planning program 134 assigns rates of change to some variables of the road repair plan. For example, planning program 134 assumes a five percent per month deterioration rate of the road problem, resulting in a five percent per month increase in raw materials. In another example, planning program 134 determines the rate of deterioration as explained above. In one embodiment, planning program 134 updates road condition database 170 with information about the road problem and the associated road repair plan.

In step 310, planning program 134 determines an optimized road repair plan. The road repair plan includes information about existing road problems and a schedule for repairing the road problems. Planning program 134 determines the optimized road repair plan based, at least in part, on information regarding one or more road problems. In various examples, the information regarding a road problem includes the severity index of the road problem, the resource requirements of repairing the road problem, the location and description of the road problem, and the impact of the road problem on current and future traffic patterns. In one embodiment, planning program 134 determines the optimized road repair plan based on a mathematical optimization algorithm utilizing a set of constraints. In some examples, constraints include current environmental conditions, traffic patterns, availability of budget and other project resources (as described previously), and events affected by or depending on the completion of a road repair (e.g., repairing a pothole on a road over which a presidential inaugural parade is scheduled to travel).

In one embodiment, the plan is optimized to schedule the maximum number of repairs. For example, based on road repair budget data (as stored in road infrastructure database 160), and the estimated cost of resources required to repair each road problem (as determined in step 308), planning program 134 determines that there is sufficient funding available to complete either one of the more costly repair projects or four of the less expensive repair projects before the end of the fiscal year. Planning program 134 optimizes the plan by scheduling four of the less expensive repair projects.

In one embodiment, the plan is optimized to prioritize repairing road problems with the highest severity level while minimizing traffic collisions. In one embodiment, the plan is optimized to minimize harmful effects on natural resources. In one example, when creating a repair plan for a pothole that is on a bridge that spans an ocean inlet, planning program 134 allocates project resources (e.g., cleaning materials, road filler materials) that are not harmful to marine life.

In one embodiment, the plan is optimized to maximize the reduction of impact of road problems on traffic patterns. For example planning program 134 determines that a road problem near a professional football stadium will not be scheduled for repair on any day that there is a football game or any other event in the stadium (i.e., days when there is a previously-identified event that will impact traffic patterns). In one embodiment, the plan is optimized to minimize the traffic pattern disruptions during a road repair project. For example, if planning program 134 determines that there are sufficient project resources within a week to repair three out of five potholes with identical severity indices, and two of the potholes are located on the same street, planning program 134 determines that those two potholes will be repaired in the same week, rather than disrupt traffic patterns on two separate occasions. In one embodiment, the plan is optimized to best utilize the skills of the road crew workers. For example, if only one worker is qualified as a field mechanic for a specialty piece of equipment that will be used for a road repair project, the plan identifies the timeframe for that project as an unavailable timeframe for that worker to schedule vacation.

In step 312, planning program 134 issues an alert to one or more interface devices. In one embodiment, planning program 134 issues the alert over network 120. In one embodiment, interface device 110 includes a programmable electronic highway sign. In this case, planning program 134 issues an alert to the programmable electronic sign, identifying a road problem and instructing the programmable sign to display a warning message such as, for example, "Road obstruction in two miles. Take alternate route." In one embodiment, interface device 110 includes an onboard computer in a vehicle that controls a sensor of sensors 140 and a safety system of the vehicle. In this case, planning program 134 issues an alert to the onboard computer, identifying an upcoming road problem and instructing the onboard computer to adjust one or both of the sensor and the safety system. For example, the onboard computer can dynamically adapt to road conditions and make adjustments to increase passenger safety or comfort (e.g., tighten seatbelts, adjust headrests, change sensitivity settings on shock absorbers), or enable additional data gathering (e.g., increase the sensitivity of an accelerometer) before the vehicle arrives at the road problem.

Figure 4:
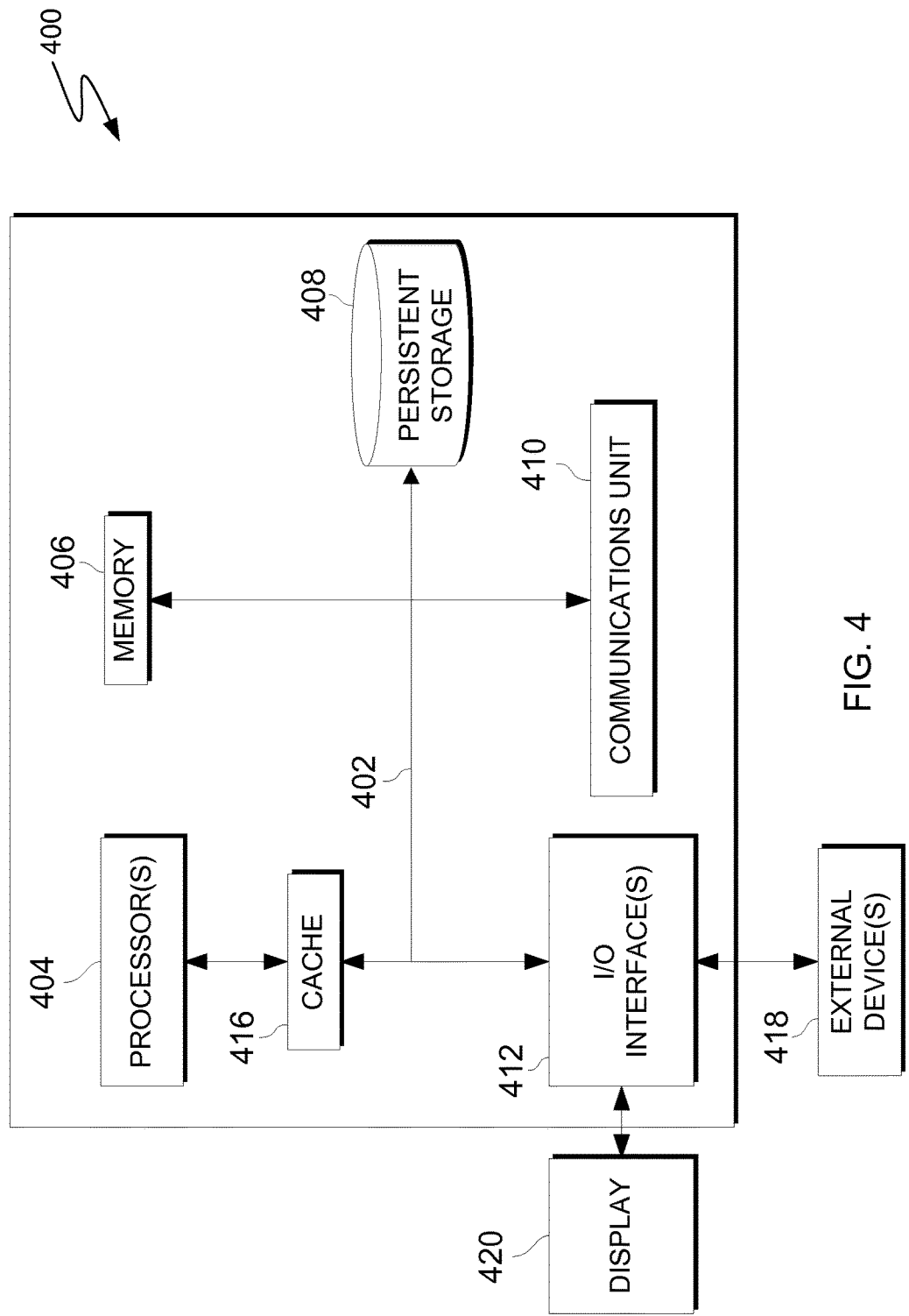
FIG. 4 is a block diagram of components of a computing device executing operations for road condition management, in accordance with an embodiment of the present disclosure.

FIG. 4 is a block diagram of components of a computing device, generally designated 400, in accordance with an embodiment of the present disclosure. In one embodiment, computing device 400 is representative of server 130 within computing environment 100, in which case server 130 includes road condition analyzer 132 and planning program 134.

It should be appreciated that FIG. 4 provides only an illustration of one implementation and does not imply any limitations with regard to the environments in which different embodiments may be implemented. Many modifications to the depicted environment may be made.

Computing device 400 includes processor(s) 404, cache 416, memory 406, persistent storage 408, communications unit 410, input/output (I/O) interface(s) 412 and communications fabric 402. Communications fabric 402 provides communications between processor(s) 404, cache 416, memory 406, persistent storage 408, communications unit 410, and input/output (I/O) interface(s) 412. Communications fabric 402 can be implemented with any architecture designed for passing data and/or control information between processor(s) (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processor(s) 404 by holding recently accessed data and data near accessed data from memory 406.

Program instructions and data used to practice embodiments of the present invention may be stored in persistent storage 408 and in memory 406 for execution by one or more of the respective processor(s) 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface(s) 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also may connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for road condition management, the method comprising:
    identifying, by one or more processors, a first road problem at a first location based, at least in part, on a current traffic pattern and current environmental conditions at the first location, wherein identifying the first road problem further comprises:
        generating, by one or more processors, a model based, at least in part, on historical traffic information, wherein the model correlates historical environmental conditions to historical traffic patterns;
        identifying, by one or more processors, a deviation of the current traffic pattern based, at least in part, on the model, the current environmental conditions, and the current traffic pattern;
        determining, by one or more processors, whether an exclusionary rule applies, wherein the exclusionary rule defines an exclusion to the model, and wherein the exclusionary rule identifies a time period and a location; and
        responsive to identifying the deviation and to determining that the exclusionary rule does not apply, identifying, by one or more processors, the first road problem;
    generating, by one or more processors, an optimized plan for road repairs, wherein the optimized plan identifies one or more road problems that include the first road problem, and wherein the optimized plan is optimized based on a severity index of each of the one or more road problems and an availability of at least one resource; and
    issuing, by one or more processors, an alert to at least one interface device, wherein the alert describes the first road problem.

2. The method of claim 1, further comprising:
    responsive to determining, by one or more processors, that a vehicle is approaching the first location, issuing, by one or more processors, a command to a sensor.

3. The method of claim 1, wherein:
    the first road problem is at least one of a pothole, an item of debris, a lane closure, and a disabled vehicle; and
    the at least one resource includes at least one of a repair crew, a road repair equipment, and a budget item.

4. The method of claim 1, wherein:
    the historical traffic patterns identify a historical path of travel of one or more vehicles;
    the current traffic pattern identifies a current path of travel of one or more vehicles; and
    identifying the deviation is further based, at least in part, on the current path of travel and the historical path of travel.

5. The method of claim 1, wherein the severity index is based on the current environmental conditions, the current traffic pattern, the historical traffic patterns, a forecast of future traffic patterns, and a forecast of environmental conditions.

6. The method of claim 2, further comprising:
    determining, by one or more processors, the current environmental conditions based, at least in part, on sensor data from at least one sensor of a plurality of sensors;
    determining, by one or more processors, the current traffic pattern based, at least in part, on sensor data from at least one sensor of the plurality of sensors; and
    wherein the plurality of sensors include at least one of an accelerometer of the vehicle, an onboard camera, an in-roadway magnetic sensor, a set of pneumatic road tubes, a Doppler radar device, a rain gauge, a thermometer, and a traffic camera.

7. The method of claim 1, wherein the at least one interface device includes at least one of an electronic billboard, an electronic street sign, a tablet computer, a mobile device, a navigation device, and a computing device of a vehicle, wherein the computing device controls an onboard sensor system or an onboard safety system of the vehicle.

8. A computer program product for road condition management, the computer program product comprising:
    a computer readable storage medium and program instructions stored on the computer readable storage medium, the program instructions comprising:
        program instructions to identify a first road problem at a first location based, at least in part, on a current traffic pattern and a current environmental conditions at the first location, wherein identifying the first road problem further comprises:
            program instructions to generate a model based, at least in part, on historical traffic information, wherein the model correlates historical environmental conditions to historical traffic patterns;
            program instructions to identify a deviation of the current traffic pattern based, at least in part, on the model, the current environmental conditions, and the current traffic pattern;

program instructions to determine whether an exclusionary rule applies, wherein the exclusionary rule defines an exclusion to the model, and wherein the exclusionary rule identifies a time period and a location; and program instructions to identify the first road problem in response to identifying the deviation and to determining that the exclusionary rule does not apply;

program instructions to generate an optimized plan for road repairs, wherein the optimized plan identifies one or more road problems that include the first road problem, and wherein the optimized plan is optimized based on a severity index of each of the one or more road problems and an availability of at least one resource; and program instructions to issue an alert to at least one interface device, wherein the alert describes the first road problem.

9. The computer program product of claim 8, wherein the program instructions further comprise:

program instructions to issue a command to a sensor in response to determining that a vehicle is approaching the first location.

10. The computer program product of claim 8, wherein:
the first road problem is at least one of a pothole, a lane closure, an item of debris, and a disabled vehicle; and
the at least one resource includes at least one of a repair crew, a road repair equipment, and a budget item.

11. The computer program product of claim 8, wherein:
the historical traffic patterns identify a historical path of travel of one or more vehicles;
the current traffic pattern identifies a current path of travel of one or more vehicles; and
the program instructions to identify the deviation comprise program instructions to identify the deviation further based, at least in part, on the current path of travel and the historical path of travel.

12. The computer program product of claim 8, wherein the severity index is based on the current environmental conditions, the current traffic pattern, the historical traffic patterns, a forecast of future traffic patterns, and a forecast of environmental conditions.

13. A computer system for road condition management, the computer system comprising:
one or more computer processors;
one or more computer readable storage media;
program instructions stored on the computer readable storage media for execution by at least one of the one or more processors, the program instructions comprising:
program instructions to identify a first road problem at a first location based, at least in part, on a current traffic pattern and a current environmental conditions at the first location, wherein identifying the first road problem further comprises:
program instructions to generate, a model based, at least in part, on historical traffic information, wherein the model correlates historical environmental conditions to historical traffic patterns;

program instructions to identify a deviation of in the current traffic pattern based, at least in part, on the model, the current environmental conditions, and the current traffic pattern;

program instructions to determine whether an exclusionary rule applies, wherein the exclusionary rule defines an exclusion to the model, and wherein the exclusionary rule identifies a time period and a location; and program instructions to identify the first road problem in response to identifying the deviation and to determining that the exclusionary rule does not apply;

program instructions to generate an optimized plan for road repairs, wherein the optimized plan identifies one or more road problems that include the first road problem, and wherein the optimized plan is optimized based on a severity index of each of the one or more road problems and an availability of at least one resource; and program instructions to issue an alert to at least one interface device, wherein the alert describes the first road problem.

14. The computer system of claim 13, wherein the program instructions further comprise:

program instructions to issue a command to a sensor in response to determining that a vehicle is approaching the first location.

15. The computer system of claim 13, wherein:
the first road problem is at least one of a pothole, a lane closure, an item of debris, and a disabled vehicle; and
the at least one resource includes at least one of a repair crew, a road repair equipment, and a budget item.

16. The computer system of claim 13, wherein:
the historical traffic patterns identify a historical path of travel of one or more vehicles;
the current traffic pattern identifies a current path of travel of one or more vehicles; and
the program instructions to identify the deviation comprise program instructions to identify the deviation further based, at least in part, on the current path of travel and the historical path of travel.

17. The computer system of claim 13, wherein the severity index is based on the current environmental conditions, the current traffic pattern, the historical traffic patterns, a forecast of future traffic patterns, and a forecast of environmental conditions.

* * * * *